Jan. 5, 1926. 1,568,056
W. BUTZ
METAL CUTTING TOOL
Filed March 14, 1922
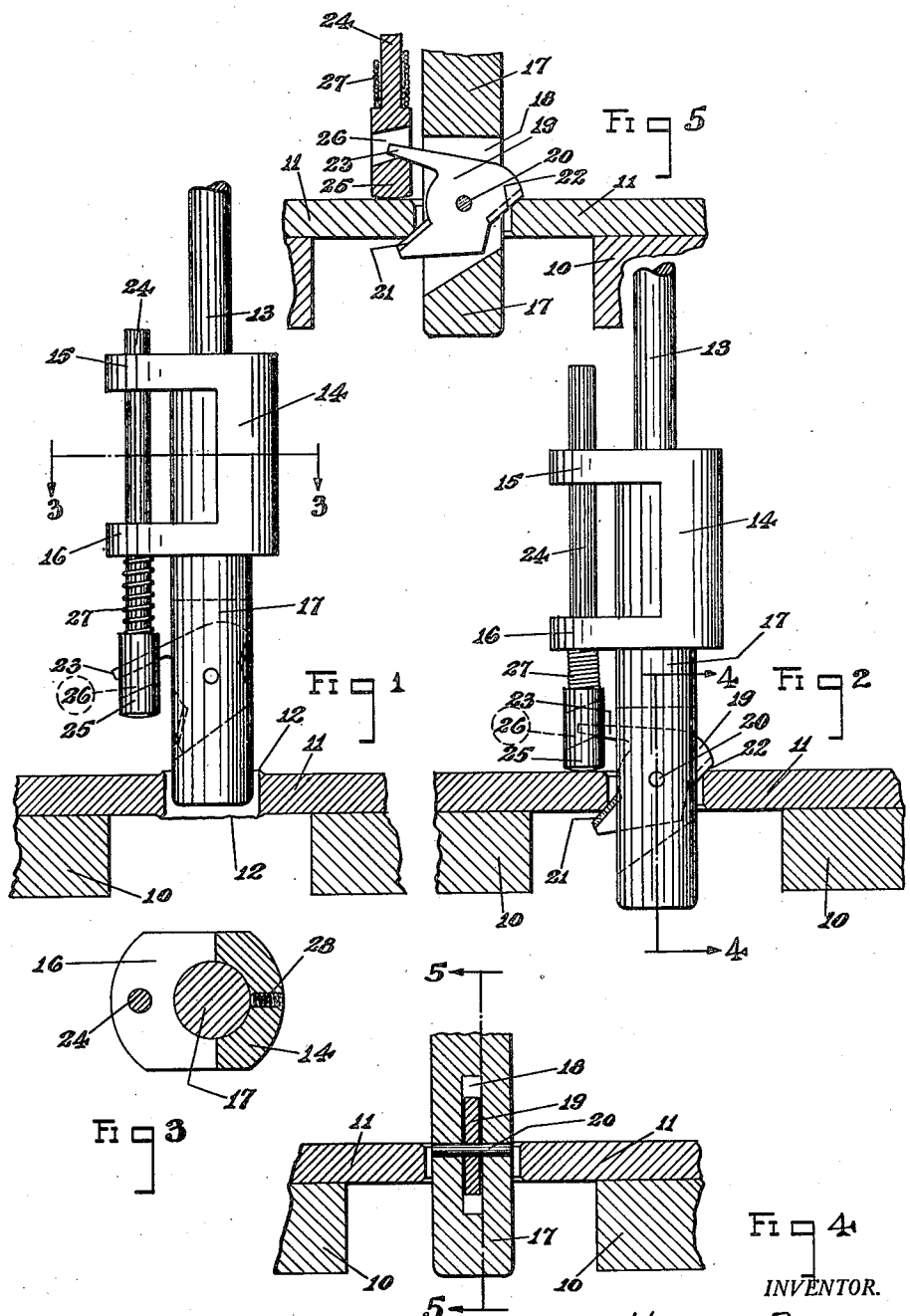
INVENTOR.
WILLIAM BUTZ.
BY
ATTORNEY
WITNESS.

Patented Jan. 5, 1926.

1,568,056

UNITED STATES PATENT OFFICE.

WILLIAM BUTZ, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

METAL-CUTTING TOOL.

Application filed March 14, 1922. Serial No. 543,684.

*To all whom it may concern:*

Be it known that I, WILLIAM BUTZ, a citizen of the United States, residing at Philadelphia, Pennsylvania, have invented certain new and useful Improvements in Metal-Cutting Tools, of which I declare the following to be a full, clear, and exact description.

This invention relates to improvements in metal cutting tools.

The leading object of my invention is to provide a tool by means of which it is possible to remove or cut away the metal around the edges of a hole, on both faces of the work, simultaneously, in other words, a tool which will countersink or dress both sides of a hole simultaneously.

Another object of my invention is to provide a tool which may be inserted through a hole and brought automatically to a position in which it will cut away the metal on both faces of the work adjacent the edges of the hole.

A further object of my invention is to provide a tool having a pivoted cutter which is automatically tilted after being inserted in the hole, so that the cutter engages both faces of the work at the edges of the hole.

A further object of my invention is to provide a cutting tool which may be inserted through a hole and operated to cut away or remove the metal adjacent the edge of the hole, on that side of the work opposite the operating spindle of the tool.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view in side elevation of a tool embodying my invention, the table and work being shown in section.

Fig. 2 is a similar view showing the cutter in working position.

Fig. 3 is a detail, sectional view, taken on line 3—3 of Fig. 1.

Fig. 4 is a detail, sectional view, taken on line 4—4 of Fig. 2, and

Fig. 5 is a detail, sectional view, taken on line 5—5 of Fig. 4.

In the drawings, the same reference numerals refer to the same parts throughout the several views and the sectional views are taken looking in the direction of the arrows at the ends of the section lines.

In general, my invention consists of a cutter-carrying member which is adapted to be carried by the rotating spindle of a drill press, for instance, and which carries a cutter movably mounted with reference to said cutter-carrying member and automatically actuated so as to move with reference to said member into working position with relation to the work. I prefer to provide means for actuating said cutter to move it to working position comprising a part which is adapted to engage the work and so connected that the engagement of such part with the work will move the cutter, with respect to the member which carries it, from its inoperative to its operative position. This tool is designed particularly for countersinking or facing both sides of a hole and the cutter-carrying member may be provided with a part which passes through the hole in the work and carries the cutter, so that the cutter is inserted through the work and then moved into working position engaging the edges of said hole. One arrangement for accomplishing the objects of my invention consists of a cutter-carrying member having a slotted shank, adapted to extend through the hole in the work, and a cutter housed in the slot of the shank and pivotally connected thereto. The cutter is of such form that, in one position, it is completely housed within the shank while, in another position, the cutting edges project laterally from the shank and engage the metal at the edges of the hole. In this case, the cutter is provided with opposed cutting edges, one of which engages the lower edge of the hole while the other engages the upper edge of the hole, so that the metal is cut away simultaneously from both edges of the hole. This is not absolutely essential to my invention, however, as one of these cutting edges might be omitted. I have shown a convenient means for swinging the cutter on its pivot to bring it to working position, comprising a spring-pressed plunger carried by the cutter-carrying member and adapted to engage the work, said plunger being connected with a part of the cutter so that the movement of the plunger relative to the cutter-carrying member, when it engages the work, automatically swings the cutter on its pivot.

In the drawings accompanying this specification, I have shown a cutting tool which embodies my invention and which I have found to be very satisfactory in practice. Referring to the numbered parts of the drawing, I have shown a table, 10, on which the work, 11, is positioned. A hole has previously been formed in the work and the metal is somewhat burred, at 12, at the edges of the hole. This tool is particularly effective for cutting away this burr. The tool might be used, however, for countersinking the hole, either on one or both sides. The table, 10, may be the table of an ordinary drill press and the tool is adapted to be connected with the spindle, 13, of such a drill press, so as to rotate and be reciprocated therewith.

This cutting tool comprises a cutter-carrying member, 17, secured to the spindle, 13, the lower portion of said member including a shank which is adapted to pass through the hole in the work. A transverse slot, 18, is formed in said shank and the cutter, 19, is disposed in said slot, being pivoted on the shank by the pin, 20. The cutter, 19, has the opposed cutting edges, 21 and 22, which are adapted to engage the lower and upper edges of the hole, respectively, when the cutter is in working position. The upper part of the cutter, 19, is provided with a laterally-extending finger, 23, which is disposed in a slot, 26, formed in the enlarged head, 25, at the lower end of a plunger, 24. The plunger, 24, is slidably mounted in the laterally-extending ears, 15 and 16, of a bracket, 14, which embraces the upper end of the cutter-carrying member, 17, and is adjustably secured thereto by means of the set screw, 28. A spring, 27, is compressed between the ear, 16, of the bracket, 14, and the head, 24, of said plunger. It will be noted that the plunger 24, is carried to one side of the spindle, 13, and the cutter-carrying member, 17, so that the head, 25, engages the work to one side of the hole therein, while the shank of the cutter-carrying member, 17, passes through said hole.

From the description of the parts given above, the operation of this device should be very readily understood. The work, 11, is placed on the table, 10, of the drill press and the rotating spindle, 13, carrying the cutter-carrying member, 17, is lowered so that the shank thereof passes through the hole in the work. In the inoperative position, the cutter is completely housed within the shank of the cutter-carrying member, 17, except for the laterally-extending finger, 23, so that the shank carrying the cutter is permitted to pass through the hole in the work. This movement of the spindle and the cutting tool causes the head, 25, of the plunger, 24, to engage the work and said plunger is pressed upwardly against the pressure of spring, 27. Due to the engagement of the finger, 23, of the cutter, 19, with the head, 25, of the plunger, the cutter is swung on its pivot, 20, until the cutting edges, 21 and 22, engage the lower and upper edges of the hole. During all this the tool is rotating continuously with the spindle, 13, and, therefore, the cutting edges, 21 and 22, of the rotary cutter cut away the metal at the lower and upper edges of the hole, remove the burr, 12, and countersink both sides of the hole simultaneously. When the spindle, 13, is moved upwardly, the pressure of the spring, 27, moves the plunger, 24, with reference to the cutter-carrying member, 17, and automatically withdraws the cutter, 19, to its inoperative position within the shank of the cutter-carrying member.

It will be observed that this cutting tool provides a very simple and effective device for countersinking or dressing both sides of a hole simultaneously. It also provides a device by which the metal may be cut away, around the edges of a hole, on that side of the work positioned next to the table, 10. This is of importance in some cases where the work can only be placed on the table in one position, for instance, in the case of hubs having double flanges where the presence of the second flange renders it difficult to get access, for any ordinary tool, to the inner surface of the flange.

I am aware that the particular cutting tool which I have described in this specification may be altered considerably without departing from the spirit of my invention and, therefore, I claim my invention broadly, as indicated by the appended claims.

Having thus described my invention, what I claim as new and useful and desire to secure by Letters Patent is:

1. A device of the class described comprising a rotatable cutter-carrying member having a shank adapted to be inserted through a hole in the work, a cutter pivoted in a slot in said shank, and a part carried by said member and rotatable therewith adapted to engage the work and operating automatically to swing said cutter on its pivot in said slot into working engagement with an edge of the hole.

2. A device of the class described comprising a rotatable cutter-carrying member having a shank adapted to be inserted through a hole in the work, a cutter pivoted on said shank, and a member slidably mounted on said cutter-carrying member and rotatable therewith and adapted to engage the work, said member being connected to said cutter whereby relative movement of said members swings the cutter on its pivot to bring the same into engagement with an edge of the hole.

3. A device of the class described comprising a rotatable cutter-carrying member having a shank adapted to be inserted through a hole in the work and provided with a transverse slot, a cutter pivoted in said slot, a plunger slidably mounted on said cutter-carrying member and rotatable therewith and adapted to engage the work, and connections between said plunger and the cutter whereby relative movement of the plunger and member swings the cutter on its pivot to bring the same into working engagement with an edge of the hole.

4. A device of the class described comprising a cutter-carrying member having a shank adapted to be inserted through a hole in the work and provided with a transverse slot, a cutter disposed in said slot and pivoted therein, said cutter being provided with a finger extending laterally from the upper end thereof, and a spring-pressed plunger slidably mounted on said cutter-carrying member and engaging the finger of said cutter, said plunger being adapted to engage the work to swing the cutter automatically into working position.

5. A device of the class described comprising a cutter-carrying member having a shank adapted to be inserted through a hole in the work and provided with a transverse slot, a cutter disposed in said slot and pivoted therein, said cutter being provided with a finger extending laterally from the upper end thereof, a plunger slidably mounted on said cutter-carrying member for engagement with the work and provided with a slot at its lower end in which said finger engages, and spring means normally pressing said plunger towards the work.

6. A device of the class described comprising a cutter-carrying member having a shank adapted to be inserted through a hole in the work, a cutter pivoted on said shank and provided with oppositely disposed cutting edges, said cutting edges being normally disposed within the confines of said shank, and automatic means adapted to engage the work operable through said engagement to swing said cutter on its pivot to bring said cutting edges into working engagement with both edges of the hole.

7. A device of the class described comprising a cutter-carrying member having a shank adapted to be inserted through a hole in the work, a cutter pivoted on said shank and provided with oppositely disposed cutting edges, said cutting edges being normally disposed within the confines of said shank, and a spring-pressed member adapted to engage the work and operating automatically through said engagement to swing said cutter on its pivot when the shank of the cutter-carrying member is inserted in the hole, so as to bring said cutting edges into working engagement with both edges of the hole.

8. A device of the class described comprising a cutter-carrying member having a shank adapted to be inserted through a hole in the work, a cutter pivotally mounted on said shank, a plunger carried by said cutter-carrying member and movable relative thereto, said plunger lying parallel to and to one side of said shank and being adapted to engage the work and connections between said plunger and cutter whereby motion of said plunger relative to the cutter-carrying member swings said cutter on its pivot.

9. A device of the class described comprising a cutter-carrying member adapted to be inserted through a hole in the work, a cutter pivotally mounted on said shank, a member clamped on said shank and provided with a laterally-projecting lug, a plunger slidably mounted in said laterally-projecting lug and extending parallel to said shank, and connections between said plunger and cutter whereby movement of said plunger relative to the shank swings said cutter on its pivot.

10. A device of the class described comprising a cutter-carrying member having a shank adapted to be inserted through a hole in the work and provided with a transverse slot, a cutter disposed in said slot and pivotally mounted on said shank, said cutter being provided with a laterally extending arm, a member adjustably secured to said shank and having laterally extending arms and a plunger slidably mounted in said arms, extending parallel to said shank and adapted to engage the work, said plunger being provided with a slot into which the arm on said cutter extends.

11. A device of the class described comprising a cutter-carrying member having a shank adapted to extend through a hole in the work, said shank having a transverse slot therein, a cutter pivotally mounted on said shank and normally disposed in said slot, said cutter having a laterally extending arm, a plunger-carrying member secured to said shank, a plunger slidably mounted in said member and extending parallel to the shank, said plunger having a head adapted to engage the work and said head having an opening into which the arm on said cutter extends, and a spring compressed between the head of said plunger and said plunger carrying-member.

In testimony whereof, I affix my signature.

WILLIAM BUTZ.